United States Patent [19]

Dickson et al.

[11] Patent Number: 5,191,204
[45] Date of Patent: Mar. 2, 1993

[54] MULTI-BEAM OPTICAL SYSTEM AND METHOD WITH POWER DETECTION OF OVERLAPPING BEAMS

[75] Inventors: LeRoy D. Dickson, Morgan Hill, Calif.; Robert S. Fortenberry, Raleigh, N.C.

[73] Assignee: International Business Machines Corporation, Armonk, N.Y.

[21] Appl. No.: 784,205

[22] Filed: Oct. 28, 1991

[51] Int. Cl.$^5$ ............................................. H01J 40/14
[52] U.S. Cl. ................................. 250/208.2; 356/222
[58] Field of Search .............. 250/211 R, 208.2, 216, 250/239; 357/19; 219/121.61, 121.62, 121.83; 372/29, 31, 43; 356/222

[56] References Cited

U.S. PATENT DOCUMENTS

| | | | |
|---|---|---|---|
| 4,297,653 | 10/1981 | Scifres et al. | 331/94.5 |
| 4,660,983 | 4/1987 | Yamamoto et al. | 356/445 |
| 4,733,067 | 3/1988 | Oinoue et al. | 250/216 |
| 4,847,848 | 7/1989 | Inoue et al. | 357/19 |
| 4,873,429 | 10/1989 | Kume et al. | 250/211 J |
| 4,877,311 | 10/1989 | Shernoff | 356/350 |
| 5,043,775 | 8/1991 | Lee | 357/19 |

FOREIGN PATENT DOCUMENTS 1-160073 6/1989 Japan .
2-79483 3/1990 Japan .

OTHER PUBLICATIONS

"Laser-power monitor system for two-laser array-has front and back detectors placed in overlapping collimated beams and back facets of laser array which are masked", Research Disclosure #313107, Apr. 20, 1990.
"Laser diode angular orientation sensing technique-directing light form external helium-neon alignment laser to diode laser and monitoring direction of light-reflected", Research Disclosure #313101, May 5, 1990.
"Laser package e.g. for optical storage disc servo electronics-has integral photodiode for power emission monitoring, and measures fraction of laser power output back-reflected from power output window", Research Disclosure #290086, Jun. 10, 1988.

Primary Examiner—David C. Nelms
Attorney, Agent, or Firm—Douglas R. Millett

[57] ABSTRACT

A dual beam laser array provides two overlapping beams for use in a direct read after write (DRAW) optical data storage system. A first portion of the overlapping beams is directed to a first optical detector and a second portion of the overlapping beams is directed to a second optical detector. A logic circuit connected to the optical detectors generates power signals representative of the power levels of each of the overlapping beams without the need to completely separate the beams.

27 Claims, 6 Drawing Sheets

MULTI-BEAM OPTICAL SYSTEM AND METHOD WITH POWER DETECTION OF OVERLAPPING BEAMS

BACKGROUND OF THE INVENTION

1. Field of the Invention

This invention relates generally to multiple beam optical systems and more particularly to a system for measuring the individual beam powers of overlapping beams.

2. Description of the Prior Art

Magneto-optic recording provides for erasable storage of data. A write laser beam is focussed onto a spot on the medium and heats the magneto-optic material to a temperature at which the magnetization of the magnetic domains of the medium may be changed. A magnetic field is applied in one of two directions to orient the magnetic domains of the spot in either an upward or downward direction.

The disk is read by focussing a polarized read laser beam onto the magneto-optic material. The read laser beam has a lower power level than the write laser beam. The Kerr effect causes the reflected beam's plane of polarization to be rotated either clockwise or counterclockwise depending on whether the spot has an upward or downward magnetic orientation. The difference in the rotation is detected and represents the recorded data.

The typical system uses one laser with variable power to do both writing and reading. In order to verify the data recorded, the disk must be rotated almost three times for each track recorded. One and one half revolutions are required on average to seek and write the track and a second revolution is required to read and verify the track just written.

In order to speed up the recording process, direct read after write (DRAW) systems have been proposed. These systems comprise two lasers; one laser (the read/write laser) to write a track and a second laser (the DRAW laser) to read the track directly after it has been written. Thus, the DRAW system requires only one and one half revolutions on average to write and verify a track on the disk. The read/write laser alone is used to read the disk when no writing function is being performed.

A problem with DRAW systems has been that the addition of the second laser beam greatly complicates the construction of the optical channel. The beams must be spaced close together in order to focus on the same track at the same time and to prevent aberration and truncation (beam obstruction) effects. However, this close spacing makes separation and power monitoring of each of the beams difficult.

Power monitoring schemes for lasers are shown in U.S. Pat. No. 4,877,311 issued Oct. 31, 1989 to Shernoff; U.S. Pat. No. 4,733,067 issued Mar. 22, 1988 to Oinoue, et al.; U.S. Pat. No. 4,660,983 issued Apr. 28, 1987 to Yamamoto, et al.; U.S. Pat. No. 4,297,653 issued Oct. 27, 1981 to Scifres, et al.; Japanese patent application 01-160073 published Jun. 22, 1989 by Kaneko, et al.; Japanese patent application 02-79483 published Mar. 20, 1990 by Shinoda, et al.; Research Disclosure 313107 published Apr. 20, 1990; Research Disclosure 313101 published May 10, 1990; and Research Disclosure 290086 published Jun. 10, 1988.

What is needed is a power monitoring scheme for measuring individual beam powers in two overlapping beams.

SUMMARY OF THE INVENTION

In accordance with the invention, a dual beam laser array is located in a housing having a cover plate. First and second optical detectors are located within the housing such that they both receive portions of the first and second beams which reflect off of the cover plate. The detectors are located at different distances from the dual lasers so that they each receive different fractional components of the first and second beams. A power monitor circuit, connected to the optical detectors, generates a first and second power signal representative of the power of each of the first and second beams, respectively. The individual beam powers of each of the overlapping beams is thereby obtained without the need to actually separate the beams.

For a fuller understanding of the nature and advantages of the present invention, reference should be made to the following detailed description taken in conjunction with the accompanying drawings.

DESCRIPTION OF THE PREFERRED EMBODIMENTS

Figure 1:
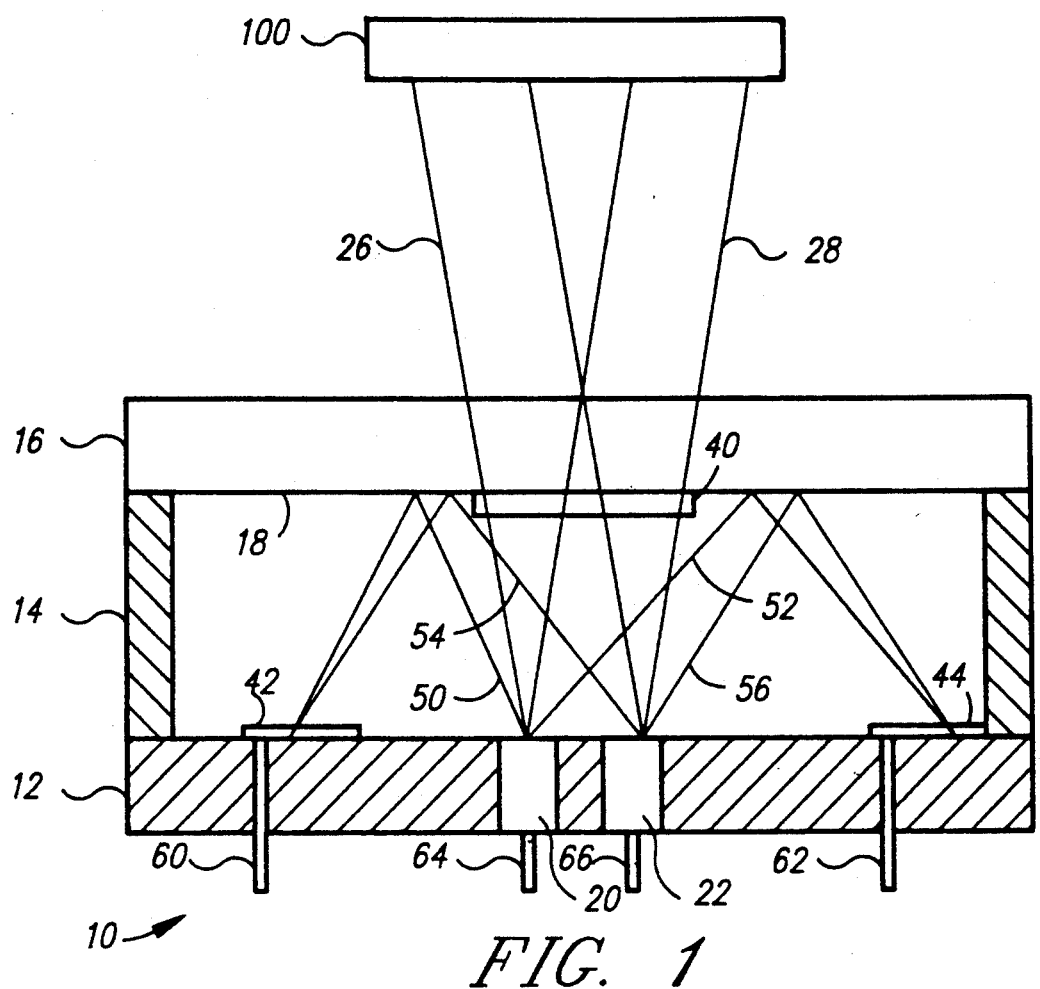
FIG. 1 is a schematic cross-sectional view of a diode laser array system of the present invention.

FIG. 1 shows a schematic cross-sectional view of a laser diode array system of the present invention and is designated by the general reference number 10. System 10 comprises a baseplate 12, a cylindrical side member 14 and a cover plate 16. Baseplate 12 and member 14 may be made of a dielectric material. Cover plate 16 is made of a transparent material, preferably glass. Baseplate 12, member 14 and cover plate 16 may be bonded together with a cement. Cover plate 16 has a lower surface 18.

A pair of laser diodes 20 and 22 are mounted within baseplate 12. In a preferred embodiment, diodes 20 and 22 are gallium-aluminum-arsenide lasers which emit light at approximately 780 nm in wavelength. Diodes 20 and 22 are preferably separated by a distance which is large enough to allow them to be focussed individually to the same track of an optical disk in a DRAW system and small enough so that there are no optical aberration problems. This distance is typically 25-200 microns.

Diodes 20 and 22 emit a pair of light beams 26 and 28, respectively. Diodes 20 and 22 emit light having a Gaussian intensity distribution. Beams 26 and 28 represent the cross-sections of the beams inside the elliptical radius where the intensity is half the maximum intensity at the center. This is known as the full width at half the maximum (FWHM). This is the most useful portion of the light and beams 26 and 28 are allowed to pass outside of array 10. An anti-reflective coating 40 is deposited on surface 18 of cover plate 16 (where beams 26 and 28 pass) in order to reduce the reflection of any of the light.

Figure 2:
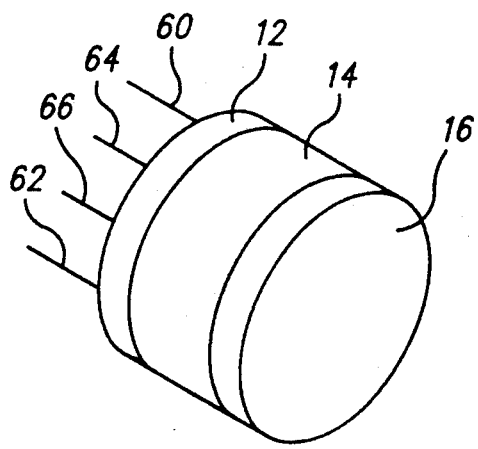
FIG. 2 is a perspective view of the system of FIG. 1.

A pair of optical detectors 42 and 44 are located on baseplate 12. Diode 20 emits a pair of peripheral beams 50 and 52, and diode 22 emits a pair of peripheral beams 54 and 56. As used herein, peripheral beams refer to that portion of the light from the diodes 20 and 22 which lies outside the respective FWHM cross sections of beams 26 and 28. A portion of beams 50 and 54 is partially reflected by surface 18 of cover plate 16 and falls on detector 42. A portion of beams 52 and 56 is partially reflected by surface 18 of cover plate 16 and falls on detector 44. Detectors 42 and 44 have a pair electrical connections 60 and 62, respectively, which pass through baseplate 12. Diodes 20 and 22 have a pair of electrical connections 64 and 66, respectively. FIG. 2 shows a perspective view of system 10.

Figure 3:
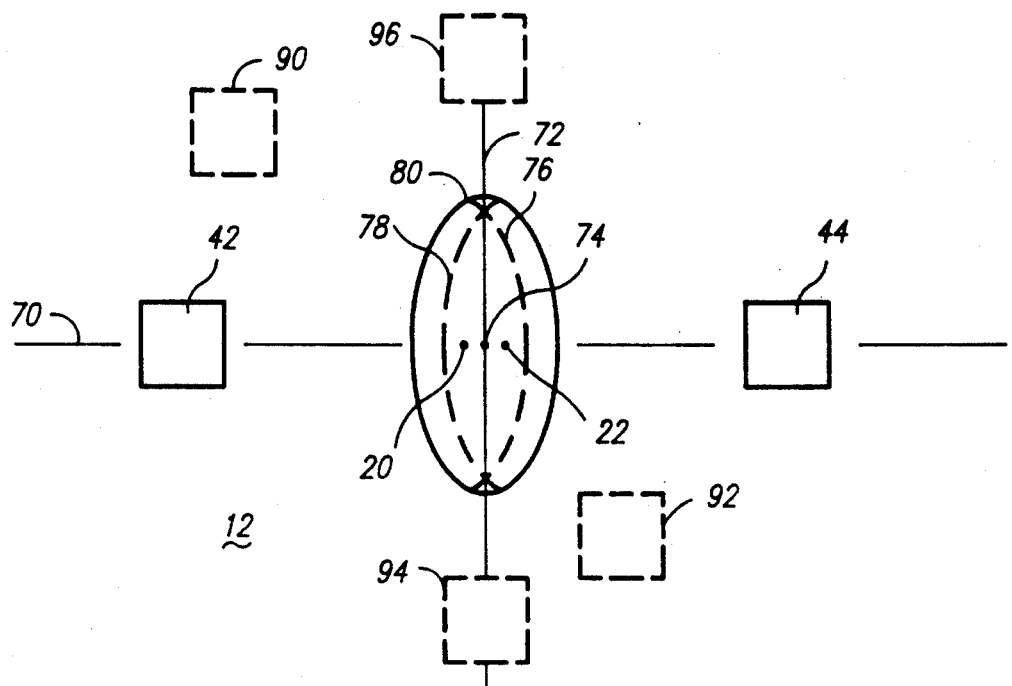
FIG. 3 is a top view of a portion of the system of FIG. 1.

FIG. 3 shows a top view of baseplate 12. Diodes 20 and 22 are located along a horizontal axis 70. A vertical axis 72 passes vertically between the diodes 20 and 22. The axes meet at a center point 74. The laser diodes 20 and 22 each emit an elliptically shaped beam. An ellipse 76 represents the FWHM cross section of beam 26 at surface 18 of cover plate 16. An ellipse 78 represents the FWHM cross section of beam 28 at surface 18 of cover plate 16. An ellipse 80 represents approximately the combined areas of ellipses 76 and 78. Anti-reflection coating 40 is preferably located and shaped to conform to ellipse 80.

Detectors 42 and 44 are located at different distances from center point 74. This is necessary to insure that each detector will receive a different fractional amount of the laser light from each of the diodes. In a preferred embodiment, detectors 42 and 44 are located along axis 70, as shown. However, alternative placement locations are also possible. Some examples of alternative placements include locating the detectors at positions 90 and 92 or at positions 94 and 96.

The present invention is able to detect the power of overlapping beams 26 and 28 by measuring the amount of light at detectors 42 and 44 and comparing that with some measured parameters. The following discussion describes how these parameters are measured.

Once the array 10 is assembled and the detectors 42 and 44 are in place, calibration measurements are performed. During the calibration process, an optical detector 100 is placed temporarily in front of cover plate 16 in order to measure the power of beams 26 and 28. First, laser 20 is turned on and laser 22 remains off. The amount of light in beam 26 is detected as a signal (P1) from detector 100. The amount of light falling on detector 42 is also measured as a signal (PA1) from detector 42. The ratio $FA1 = PA1/P1$ is then determined. The amount of light at detector 44 is then measured as signal (PB1) from detector 44. The ratio $FB1 = PB1/P1$ is then determined.

Laser 20 is switched off and laser 22 is turned on. The amount of light in beam 28 is measured as a signal (P2) from detector 100. The amount of light at detector 42 is measured as a signal (PA2) from detector 42. The amount of light at detector 44 is measured as a signal (PB2) from detector 44. The ratios $FA2 = PA2/P2$ and $FB2 = PB2/P2$ are determined.

The detector 100 is removed. Now when both lasers 20 and 22 are operating, the total amount of light at detector 42 is measured as a signal PA and the amount of light at detector 44 is measured as a signal PB. The following equations are derived:

$$PA + PB = FA1 \times P1 + FA2 \times P2 + FB1 \times P1 + FB2 \times P2 \tag{1}$$

$$PA - PB = FA1 \times P1 + FA2 \times P2 - FB1 \times P1 - FB2 \times P2 \tag{2}$$

These two equations can be rearranged to give:

$$C1 \times P1 + C2 \times P2 = PA + PB \tag{3}$$

$$C3 \times P1 + C4 \times P2 = PA - PB \tag{4}$$

where:

$$C1 = FA1 + FB1$$

$$C2 = FA2 + FB2$$

$$C3 = FA1 - FB1$$

$$C4 = FA2 - FB2$$

PA and PB are measured values, so equations (3) and (4) are two equations with two unknowns (P1 and P2) which can be determined by solving the equations. The solutions are as follows:

$$P1 = K4 \times (PA + PB) - K2 \times (PA - PB) \tag{5}$$

$$P2 = K1 \times (PA - PB) - K3 \times (PA + PB) \tag{6}$$

where:

$Kn = Cn/DETC$, for $n = 1, 2, 3, 4$ and
$DETC = C1 \times C4 - C2 \times C3$.

The values of Kn are known as the beam power ratios.

Figure 4:
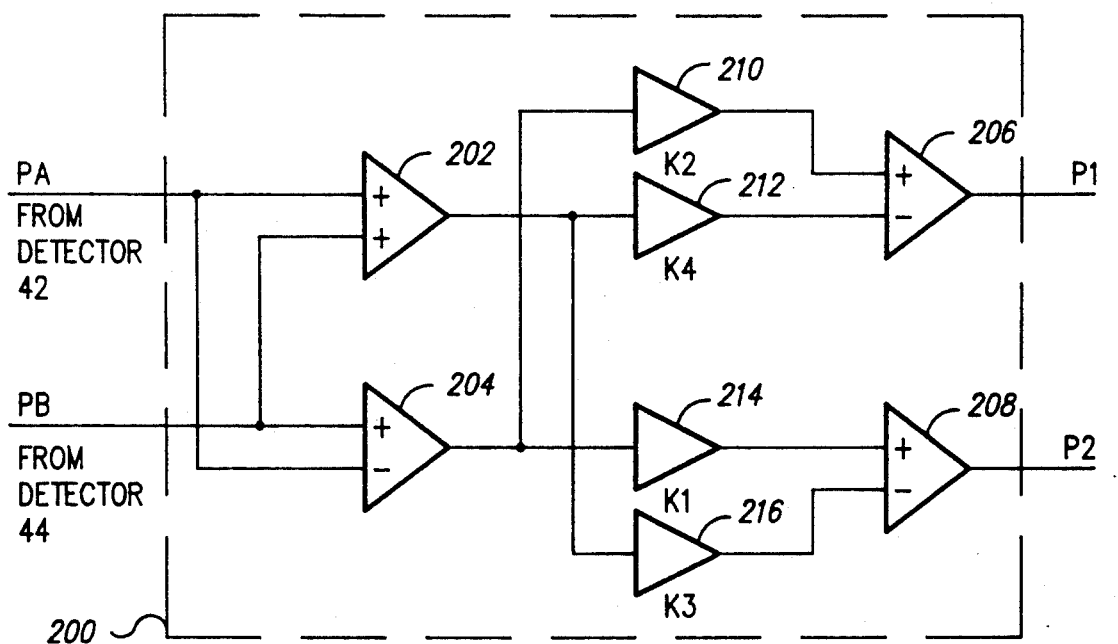
FIG. 4 is a circuit diagram of a power monitoring circuit.

FIG. 4 shows a circuit diagram of a power monitor circuit 200 which implements the equations (5) and (6) electronically. Circuit 200 is comprised of a summing amplifier 202, a plurality of differential amplifiers 204, 206 and 208 and a plurality of amplifiers 210, 212, 214 and 216. Amplifiers 210, 212, 214 and 216 provide amplification factors equal to the beam power ratios of K2, K4, K1 and K3, respectively. These factors have previously been determined by the calibration process described above.

Figure 5:
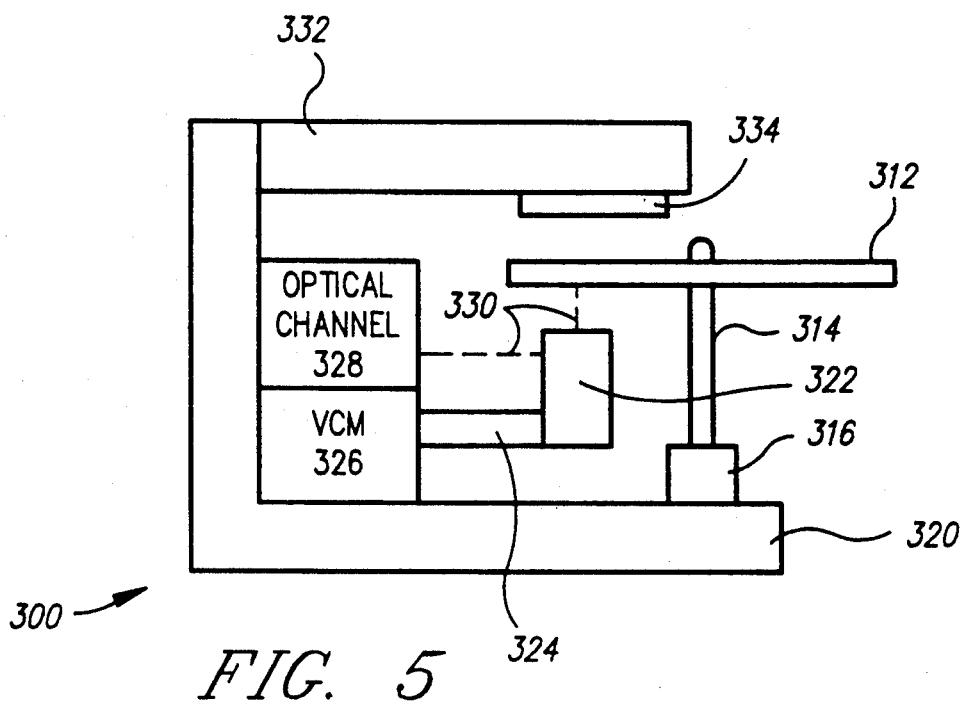
FIG. 5 is a schematic diagram of an optical data storage system.

FIG. 5 shows a schematic diagram of a DRAW optical data storage system of the present invention and is designated by the general reference number 300. System 300 includes an optical data storage disk 312. Disk 312 is preferably a magneto-optic (MO) type of disk. Disk 312 is mounted on a spindle 314 which is attached to a spindle motor 316. Motor 316 is attached to a system chassis 320. Motor 316 rotates spindle 314 and disk 312.

An optical head 322 is positioned below disk 312. Head 322 is attached to an arm 324 which in turn is connected to a voice coil motor 326. Motor 326 is attached to chassis 320 and moves arm 324 and head 322 in a radial direction below disk 312. A dashed line 330 shows the path of light from an optical channel 328 to head 322 and disk 312 and back. A magnet arm 322 is connected to chassis 320 and extends over disk 312. A bias magnet 334 is mounted to arm 332.

Figure 6:
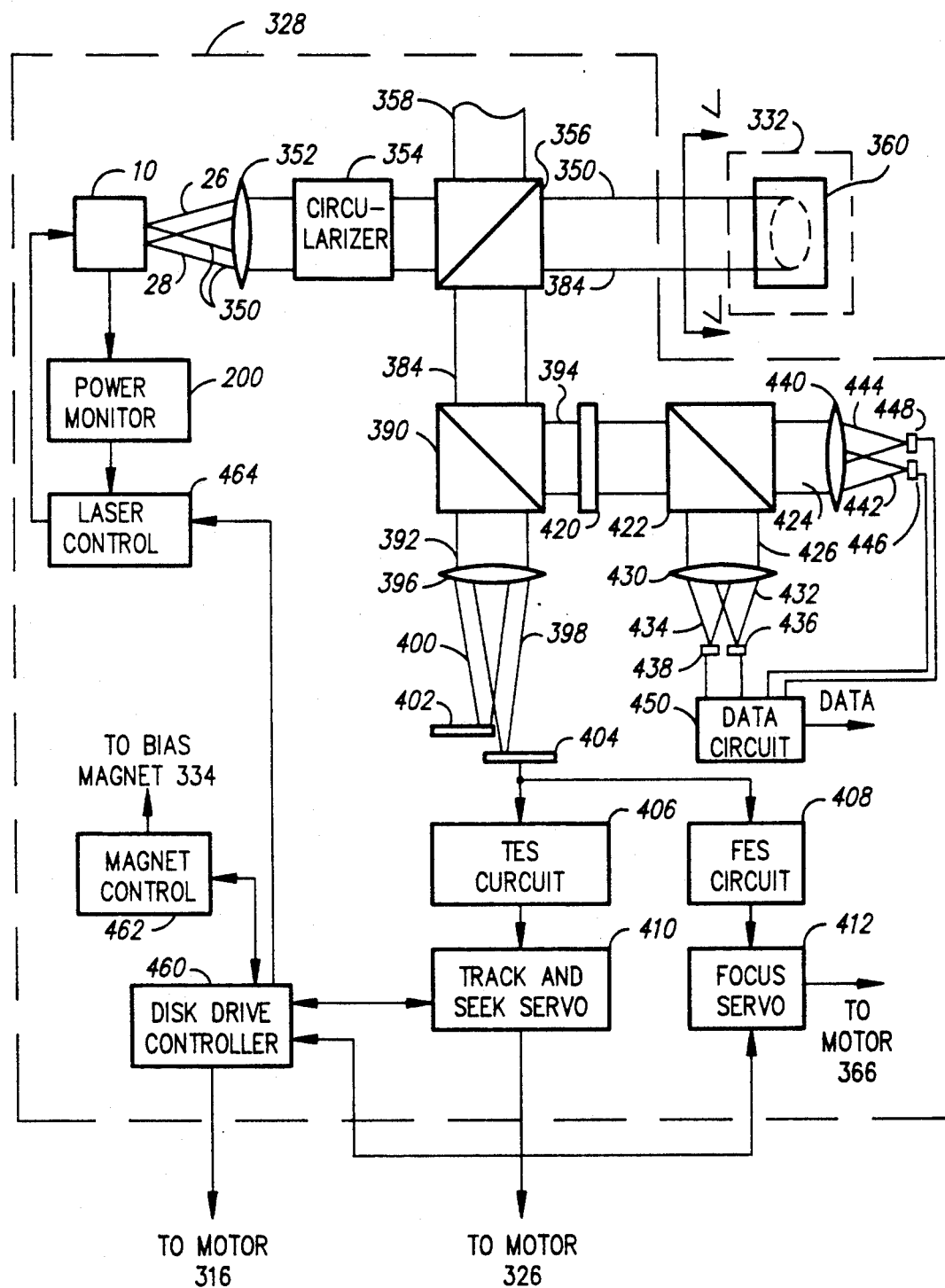
FIG. 6 is a schematic diagram of a portion of the system of FIG. 5.

FIG. 6 shows a schematic diagram of optical channel 328. Laser array 10 of FIG. 1 produces a polarized read/write (R/W) beam 26 and a polarized direct read after write (DRAW) beam 28. The overlapping beams 26 and 28 will be referred to as a transmission beam 350. Beam 350 is collimated by a collimating lens 352 and is circularized by a circularizer 354. Actually, because of their separate points of origin, beams 26 and 28 will be slightly offset in angle from each other after passing through lens 352. Circularizer 354 is preferably a prism. Beam 350 passes to a beamsplitter 356. A portion of beam 350 is directed away from beamsplitter 356 as beam 358 and is unused in this embodiment. The remaining portion of beam 350 passes to the optical head 332. Head 332 has a beam bender mirror 360 oriented at a forty-five degree angle such that beam 350 is directed upward and out of the surface of the page of FIG. 6.

Figure 7:
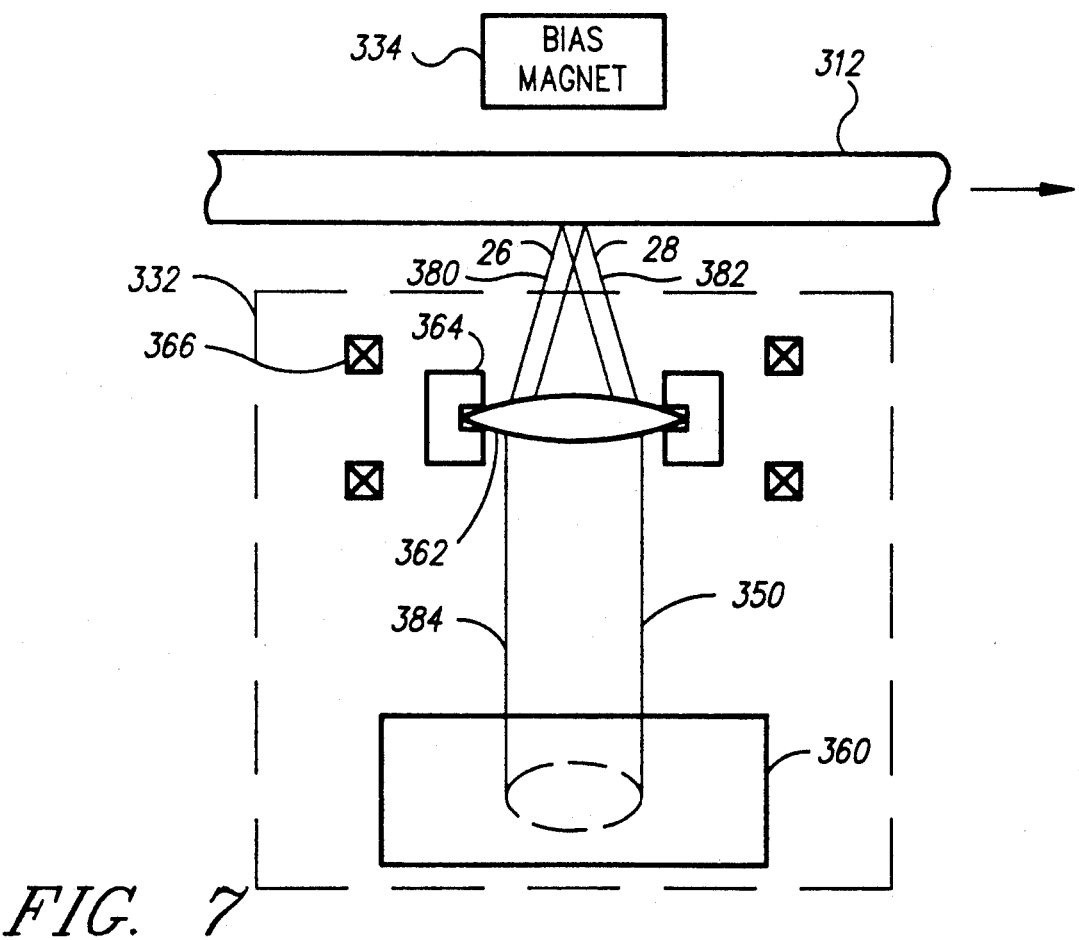
FIG. 7 is a schematic diagram of a portion of the system of FIG. 5.

FIG. 7 shows a side view of the optical head 332 from the perspective shown by the arrows in FIG. 6. The beam 350 is directed upwards from mirror 360 to a lens 362. Lens 362 is located in a holder 364 which is attached to a voice coil motor 366. Motor 366 moves lens 362 vertically up or down in order to focus the light onto the disk 312. At lens 362, the light beam 350 is divided back into the R/W beam 26 and the DRAW beam 28.

The beams 26 and 28 focus to the same track of disk 312. A disk 312 rotates in the direction of the arrow, the track is written by beam 26 and then verified by beam 28. Beams 26 and 28 are reflected by disk 312 as a reflected R/W beam 380 and a reflected DRAW beam 382. The overlapping beams 380 and 382 will be referred to as a reflected beam 384. The reflected beam 384 is collimated by lens 362 and is reflected by mirror 360.

See FIG. 6 Beam 384 passes through beamsplitter 356. At beamsplitter 356 a portion of beam 384 is reflected toward a beamsplitter 390. Beamsplitter 390 divides beam 384 into a servo beam 392 and a data beam 394. Servo beam 392 passes to a lens 396 which focuses and divides beam 392 into a R/W component beam 398 and a DRAW component beam 400. A knife edge 402 blocks beam 400. Beam 398 passes to a servo optical detector 404. Detector 404 may be a segmented spot size measuring detector as is known in the art. A tracking error circuit 406 and a focus error circuit 408 are connected to detector 404. Circuit 406 generates a tracking error signal which is used by a track and seek servo 410 to control motor 326 to keep the beams on track. Circuit 408 generates a focus error signal which is used by a focussing servo 412 to control motor 366 to move lens 362 in order to keep the beams focussed on the disk 312.

Data beam 394 passes through a quarter waveplate 420 to a polarizing beamsplitter 422. Beamsplitter 422 divides beam 394 into orthogonally polarized beams 424 and 426. A lens 430 focuses and divides beam 426 into a R/W component beam 432 and a DRAW component beam 434. Beams 432 and 434 fall upon a pair of optical detectors 436 and 438, respectively. A lens 440 focuses and divides beam 424 into a R/W component beam 442 and a DRAW beam 444. Beams 442 and 444 fall upon a pair of optical detectors 446 and 448, respectively. Detectors 436, 438, 446 and 448 are connected to a data circuit 450.

A disk controller 460, as is known in the art, provides overall system control. Controller 460 is connected to a magnet control 462, a laser control 464, motor 316 and servos 410 and 412 which are known in the art. Power monitor circuit 200 is connected between array 10 and laser control 464.

Figure 8:
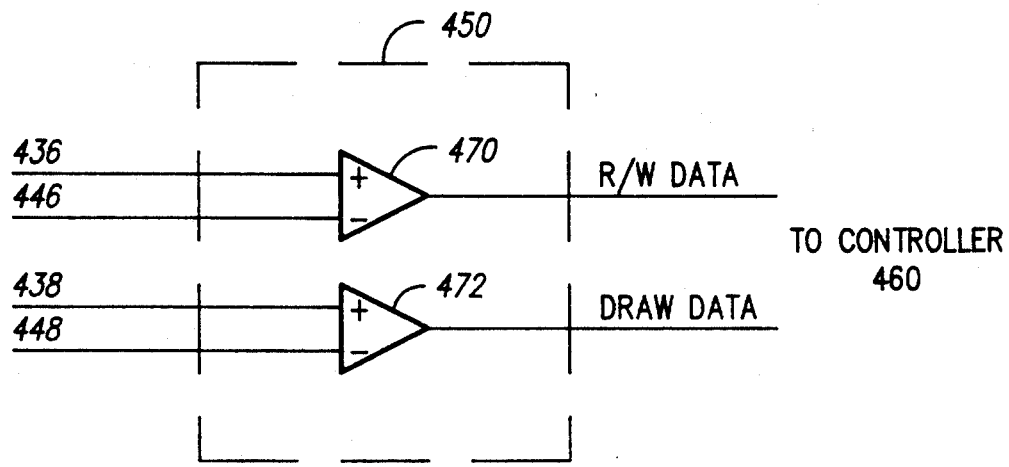
FIG. 8 is a circuit diagram of a data circuit.

FIG. 8 shows a circuit diagram of a data circuit 450. Circuit 450 is comprised of a pair of differential amplifiers 470 and 472. This circuit compares the relative power in the two polarization components of the R/W and DRAW beams and generates a R/W data signal and a DRAW data signal responsive thereto.

The operation of system 300 may now be understood. When it is desired to write data on disk 312, controller 460 causes laser control 464 to energize laser array 10 such that both beams 26 and 28 are produced. The detectors located inside array 10 provide signals which are used by the power monitor circuit 200 to generate power signals representative of the respective power of beams 26 and 28. Laser control 464 uses these power signals to adjust the intensity of beams 26 and 28. The R/W beam 26 is set at a higher power than the DRAW beam 28.

Beams 26 and 28 are then directed to the disk 312 as explained above. Beam 26 is of sufficient power to heat the MO material of disk 312 to a temperature above its Curie temperature. At this temperature the magnetic domains of the material may be oriented in an opposite direction by bias magnet 334. Typically, the domains of media 312 are oriented in an original direction and bias magnet 334 is used to reverse the domains of those spots which beam 26 heats above the Curie temperature. Controller 460 causes laser control 464 to pulse beam 26 responsive to the data to be recorded.

Disk 312 rotates and the spots just recorded by beam 26 pass under the DRAW beam 28. Beam 28 is a lower power level than beam 26 and does not heat the material above the Curie temperature. The beam 382 has its plane of polarization rotated one way or the other depending upon the magnetic orientation of the recorded spots. This is known as the Kerr effect. In this way DRAW beam 28 reads the data just written by beam 26. Reflected beam 380 and 382 return to the optical channel 328.

The DRAW servo beam 400 is completely blocked by the knife edge 402 such that only the R/W servo beam 398 is used to provide the servo signals for focussing and tracking. The track servo 410 controls motor 326 to keep the beams on track and the focus servo 412 controls motor 366 to keep the beams in focus on disk 312.

The DRAW data beams 434 and 444 are detected by detectors 438 and 448, respectively, and data circuit 450 generates a DRAW data signal which is representative of the recorded data. Controller 460 uses the signal to verify that the data just written was accurately recorded. During the write operation, the R/W data signal is ignored by controller 460.

During a read operation, controller 460 causes laser control 464 to energize array 10 such that only the R/W beam 26 is produced. The power of beam 26 is adjusted such that it does not heat the media of disk 312 above its Curie temperature. This lower power beam 26 is reflected by the disk 312 as beam 380. The R/W data beams 432 and 442 are detected by detectors 436 and 446, respectively, and data circuit 450 generates a R/W data signal.

It can be seen that the system 300 is very dependent upon accurate power monitoring of the two laser beams. The present invention provides a compact and precise measurement of the power of these beams.

Figure 9:
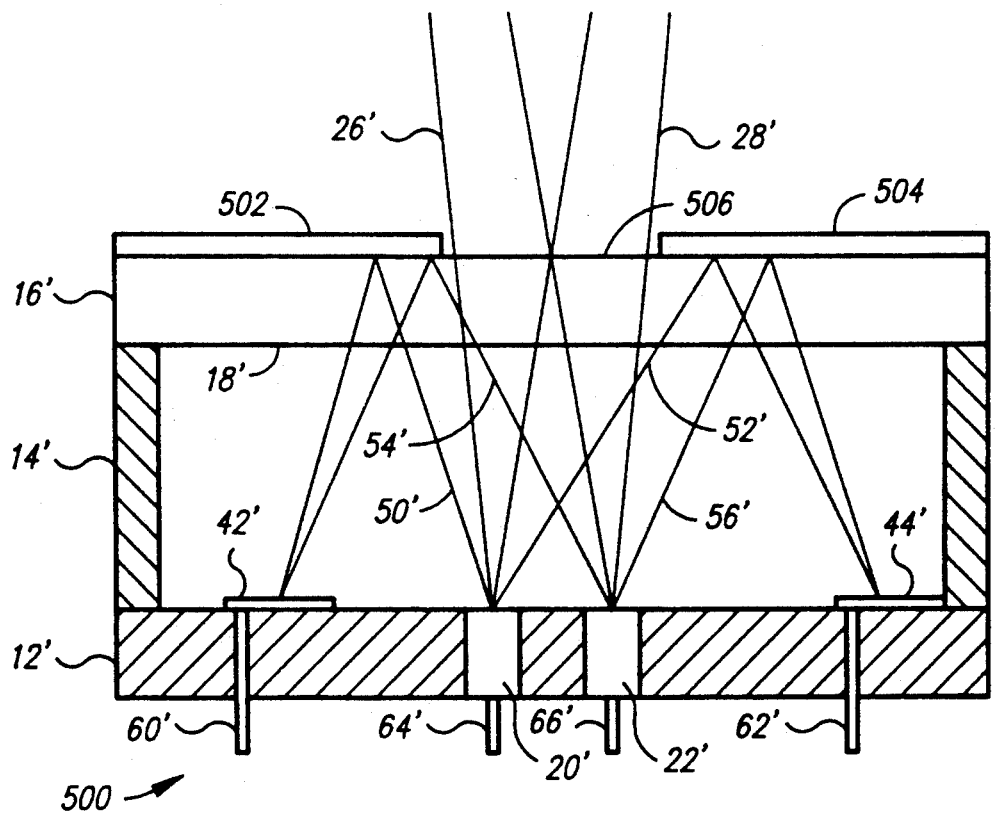
FIG. 9 is a schematic cross-sectional view of an alternative diode laser array system of the present invention.

FIG. 9 shows a schematic cross-sectional view of an alternative embodiment of the laser array system of the present invention and is designated by the general reference number 500. Elements of array 500 which are similar to array 10 are designated by a prime number. Note that in array 500 the anit-reflective coating 40 has been omitted. Instead of mirror coating 502 is deposited onto the upper surface 504 of cover plate 16'. The coating 502 is not deposited over the area 506 where beams 26' and 28' exit cover plate 16'. The result is that detectors 42' and 44' receive all of beams 50', 52', 54' and 56' reflected from the coating 502 at surface 504. The operation of array 500 is otherwise similar to that described for array 10.

Figure 10:
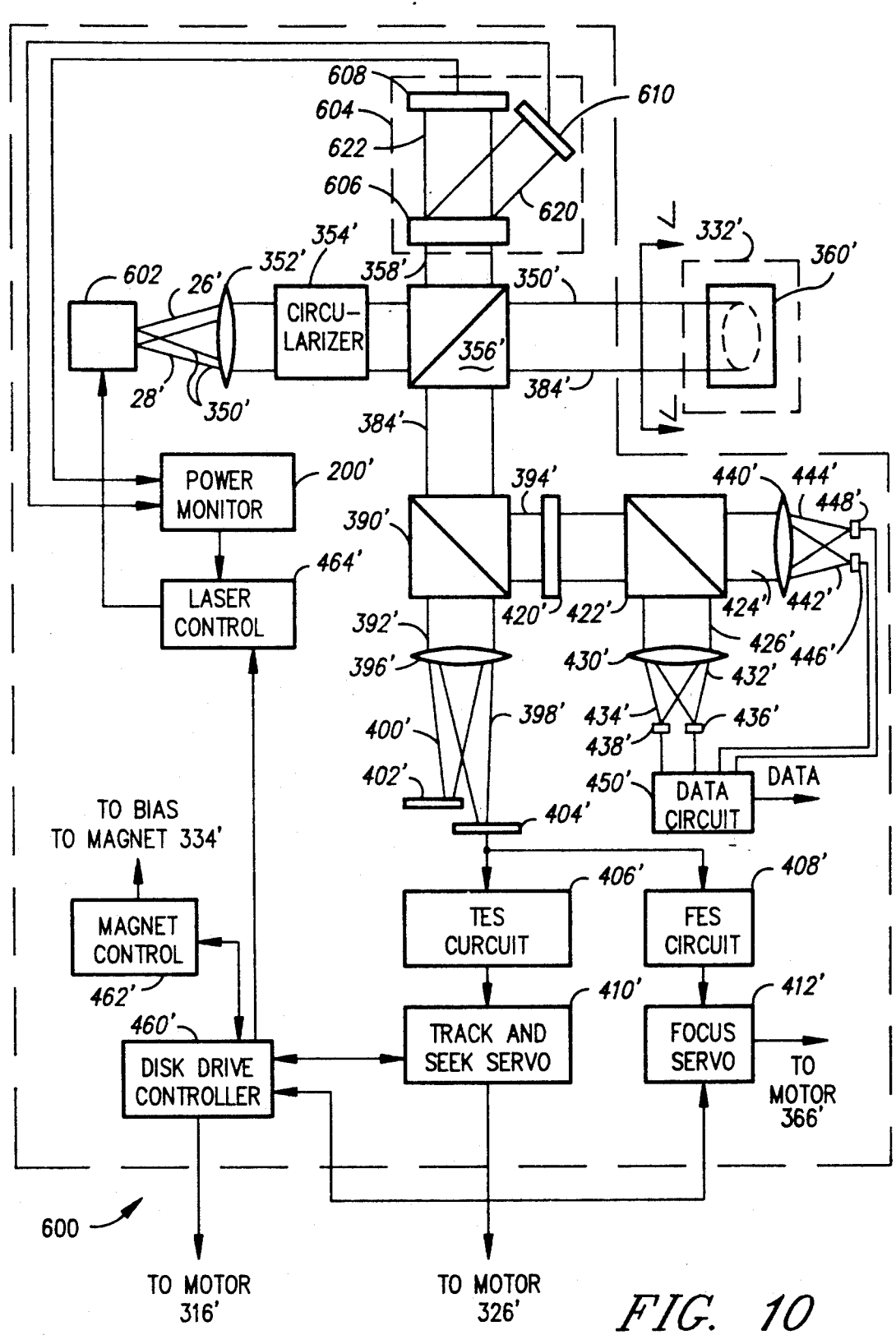
FIG. 10 is a schematic view of an alternative embodiment of the system of the present invention.

FIG. 10 shows a schematic diagram of an alternative embodiment of the optical channel and is designated by the general reference number 600. Elements of channel 600 which are similar to channel 328 are designated by a prime number. In channel 600 a dual beam laser array 602 as is known in the art, is substituted for array 10. Array 602 does not have the internal power monitoring detectors of array 10.

A power monitor section 604 has been added. Section 604 comprises an optical diffraction element 606 and a pair of optical detectors 608 and 610. Optical diffraction element 606 may be a hologram. Element 606 receives the previously unused beam 358' from beamsplitter 356' and divides it into a diffracted beam 620 which is received by detector 610 and an undiffracted beam 622 which is received by detector 608.

Detectors 608 and 610 are connected to power monitor circuit 200' similar to that shown for detectors 42 and 44 in FIG. 4. The calibration process to calibrate the appropriate values for K1, K2, K3 and K4 is similar to that described above. One of beams 26' or 28' is energized at a time and the appropriate measurements are made. The temporary optical detector 100' may be placed between beamsplitter 356' and head 332' during these measurements.

In operation, portions of overlapped beams 26' and 28' are contained in beam 358'. Due to the fact that beams 26' and 28' are slightly offset in angle from each other, they will experience different diffraction efficiencies at the diffraction element 606. For example, 50 percent of beam 26' contained in beam 358' may be diffracted into beam 620, while only 40 percent of beam 28' which is contained in beam 358' may be diffracted into beam 620. Remaining undiffracted portions of each beam 26' and 28' are contained in beam 622. Even though both beam 620 and 622 contain portions of both beams 26' and 28', circuit 200' is able to generate a power signal representing the power levels of each beam.

Other alternative embodiments of the present invention are also possible. For example, the present invention could also be adapted to measure the power levels of three or more overlapping beams. In such a case, a number of optical detectors equal to the number of overlapping beams is required. A solution is then calculated for the power levels of each of the beams and implemented in circuitry similar to that described above.

The present invention may also be used in other types of erasable optical storage systems. For example, the present invention could be used to monitor the power levels of a DRAW system which uses a phase change type of erasable optical media.

The advantages of the present invention may now be understood. DRAW systems require two closely spaced overlapping beams in the same optical channel. This makes detection of the power level of each beam difficult. The present invention teaches a way to monitor each beam's power by detecting different portions of the overlapping beam. There is no need to use costly and bulky lenses and other optics to completely separate the beams before detecting the power level.

While the invention has been particularly in shown and described with reference to the preferred embodiments thereof, it will be understood by those skilled in the art that various other changes in form and details may be made therein without departing from the spirit and scope of the invention.

What is claimed is:

1. A multi-beam optical system comprising:
   a radiation source for providing a plurality of N overlapping radiation beams, where N is an integer greater than one;
   a plurality of N radiation detectors;
   a means for directing a different portion of each of the N beams to each of the N detectors; and
   power detection means connected to the detectors for generating a separate power signal representative of the individual power of each of the N beams.

2. The system of claim 1, wherein the power detection means includes means for storing information representative of beam power ratios.

3. The system of claim 1, further comprising a housing for enclosing the radiation source and the detectors.

4. The system of claim 3, wherein the housing includes a transparent coverplate and wherein the directing means comprises the internal surface of the coverplate.

5. The system of claim 4, wherein the internal surface of the coverplate has an anti-reflective coating located such that radiation which is not needed for the detectors is allowed to pass outside the housing.

6. The system of claim 3, wherein the housing includes a transparent coverplate having a mirror coating on a portion of an outside surface of the coverplate, and wherein the directing means comprises the mirror coating.

7. The system of claim 1, wherein the directing means comprises a reflective surface for reflecting the portions of the N beams to the detectors.

8. The system of claim 1, wherein the directing means comprises a diffraction element.

9. A multi-beam optical system comprising:
   a pair of diode lasers for providing a pair of overlapping beams;
   a housing containing the diode lasers, and having a transparent coverplate;
   a pair of optical detectors located within the housing for receiving portions of the overlapping beams; and
   a power detection means connected to the optical detectors for generating a separate power signal representative of the individual power of each of the beams.

10. The system of claim 9, wherein the coverplate includes an anti-reflective coating located on a central portion of its inner surface proximate to the diode lasers.

11. The system of claim 9, further comprising a mirror located proximate to the coverplates for reflecting the portions of the overlapping beams to the detectors.

12. The system of claim 9, further including a mirror coating located on a peripheral portion, relative to the diode lasers, of an outer surface of the coverplate, for reflecting the portions of the overlapping beams to the detectors.

13. The system claim 9, wherein the power detection means comprises a first summing amplifier connected to the pair of optical detectors, a first differential amplifier connected to the pair of optical detectors, a first amplifier connected to the first differential amplifier, a second amplifier connected to the first summing amplifier, a third amplifier connected to the first differential amplifier, a fourth amplifier connected to the first summing amplifier, a second differential amplifier connected to the first and second amplifiers, and a third differential amplifier connected to the third and fourth amplifiers.

14. A multi-beam optical system comprising:
a pair diode lasers for providing a pair of overlapping beams;
a diffraction means for receiving the overlapping beams and diffracting a first portion of the overlapping beams and allowing a second portion of the overlapping beams to pass undiffracted;
a first optical detector for receiving the first portion;
a second optical detector for receiving the second portion; and
a power detection means connected to the first and second optical detectors for generating a separate power signal representative of the individual power of each of the overlapping beams.

15. The system of claim 14, wherein the diffraction means is a hologram.

16. The system of claim 14, wherein the power detection means comprises a first summing amplifier connected to the pair of optical detectors, a first differential amplifier connected to the pair of optical detectors, a first amplifier connected to the first differential amplifier, a second amplifier connected to the first summing amplifier, a third amplifier connected to the first differential amplifier, a fourth amplifier connected to the first summing amplifier, a second differential amplifier connected to the first and second amplifiers, and a third differential amplifier connected to the third and fourth amplifiers.

17. A multi-beam optical system comprising:
an optical data storage medium;
a radiation source for providing a plurality of N overlapping radiation beams, where N is an integer is greater than one;
means for separating the overlapping radiation beams into a first and second component;
a plurality of N optical detectors for receiving different portions of the first component;
a power detection means connected to the optical detectors for generating a separate power signal representative of the individual power of each of the N beams;
a transmission means for transmitting the second compartment to the medium; and
a reception means for receiving a reflected portion of the second component from the medium and generating a data signal responsive thereto.

18. The system of claim 17, wherein the power detection means includes means for storing information representative of beam power ratios.

19. The system of claim 17, further comprising a housing enclosing the radiation source and the detectors.

20. The system of claim 19, wherein the housing includes a transparent coverplate and the detectors receive radiation reflected from the internal surface of the coverplate.

21. The system of claim 20, wherein the internal surface of the coverplate has an anti-reflective coating located such that the second component radiation is allowed to pass outside the housing.

22. The system of claim 19, wherein the housing includes a transparent coverplate having a mirror coating on a portion of an outside surface of the coverplate, such that the first component radiation is reflected from the mirror coating to the detectors.

23. The system of claim 17, further comprising a diffraction element for receiving the first component and directing portions of the first component to the detectors.

24. The system of claim 17, wherein the power detection means comprises a first summing amplifier connected to the pair of optical detectors, a first differential amplifier connected to the pair of optical detectors, a first amplifier connected to the first differential amplifier, a second amplifier connected to the first summing amplifier, a third amplifier connected to the first differential amplifier, a fourth amplifier connected to the first summing amplifier, a second differential amplifier connected to the first and second amplifiers, and a third differential amplifier connected to the third and fourth amplifiers.

25. A method for a multi-beam optical system comprising the steps of:
generating a plurality of N overlapping radiation beams, where N is an integer greater than one;
directing a different portion of each of the overlapping radiation beams to each detector of a plurality of N radiation detectors;
measuring the amount of radiation at each detector; and
comparing the measured radiation from the detectors with predetermined beam power ratios and generating a separate power signal representative of the individual power of each of the N beams.

26. The method of claim 25, wherein the step of directing the radiation beams includes reflecting the overlapping radiation beams off of a reflective surface.

27. The method of claim 25, wherein the step of directing the radiation beams includes passing the radiation beams through a diffraction element.

* * * * *